United States Patent
Hwang (10) Patent No.: US 6,173,079 B1
(45) Date of Patent: Jan. 9, 2001

(54) BUFFER DATA CONTROL CIRCUIT AND METHOD IN IMAGE COMPRESSION SYSTEM USING WAVELET SYSTEM USING WAVELET TRANSFORM

(75) Inventor: Jae-Sik Hwang, Ahnyang (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/082,008

(22) Filed: May 20, 1998

Related U.S. Application Data (60) Provisional application No. 60/059,155, filed on Sep. 17, 1997.

(51) Int. Cl.⁷ ............................... G06K 9/36; G06K 9/46
(52) U.S. Cl. ............................................. 382/239; 348/404
(58) Field of Search ..................... 382/239, 232, 382/240, 248; 348/404, 384, 403

(56) References Cited

U.S. PATENT DOCUMENTS

| | | | |
|---|---|---|---|
| 5,420,636 | * 5/1995 | Kojima | 348/403 |
| 5,546,477 | 8/1996 | Knowles et al. | 382/242 |
| 6,023,296 | * 2/2000 | Lee et al. | 348/405 |

FOREIGN PATENT DOCUMENTS

411112984 * 4/1999 (JP) .

* cited by examiner

Primary Examiner—Joseph Mancuso
Assistant Examiner—F. E. Cooperrider
(74) Attorney, Agent, or Firm—Sughrue, Mion, Zinn, Macpeak & Seas, PLLC (57) ABSTRACT

An apparatus and method are provided for controlling the amount of image compression data which is to be encoded in an image compression system using a wavelet transform. The amount of data accumulated in a channel buffer is controlled by removing from the wavelet-transformed image data, data cells which contain a frequency band and having a spatial orientation to which human eyes are less sensitive. An estimation is made as to how much data will accumulate in the channel buffer, based on a cyclic integration of the rate at which data is input to the channel buffer. The estimation is compared to a set of predetermined thresholds to determine how much if any of the wavelet-transformed image data is to be removed. If the estimation indicates an overflow, data cells $D_2^3$, $D_4^3$, and $D_8^3$ are removed from the wavelet-transformed image frame. After overflow has been avoided, only data cell $D_2^3$ is removed. If the estimation indicates an underflow, no data cells are removed. This results in an improved data transmission rate, while at the same time good picture quality is still obtained when the image transmitted through the channel is reproduced.

13 Claims, 6 Drawing Sheets

BUFFER DATA CONTROL CIRCUIT AND METHOD IN IMAGE COMPRESSION SYSTEM USING WAVELET SYSTEM USING WAVELET TRANSFORM

CROSS REFERENCE TO RELATED APPLICATIONS

This application is an application filed under 35 U.S.C. § 111 (a) claiming benefit pursuant to 35 U.S.C. § 119(e)(i) of the filing date of the Provisional Application Ser. No. 60/059,155, filed Sep. 17, 1997, pursuant to 35 U.S.C. § 111(b).

BACKGROUND OF THE INVENTION

1. Field of the Invention

The present invention relates to a buffer data control circuit and method. More particularly, the present invention relates to a circuit and method which controls the amount of image compression data, which is processed in an image compression system using wavelet transform, accumulated in a channel buffer.

2. Background Art

Figure 1:
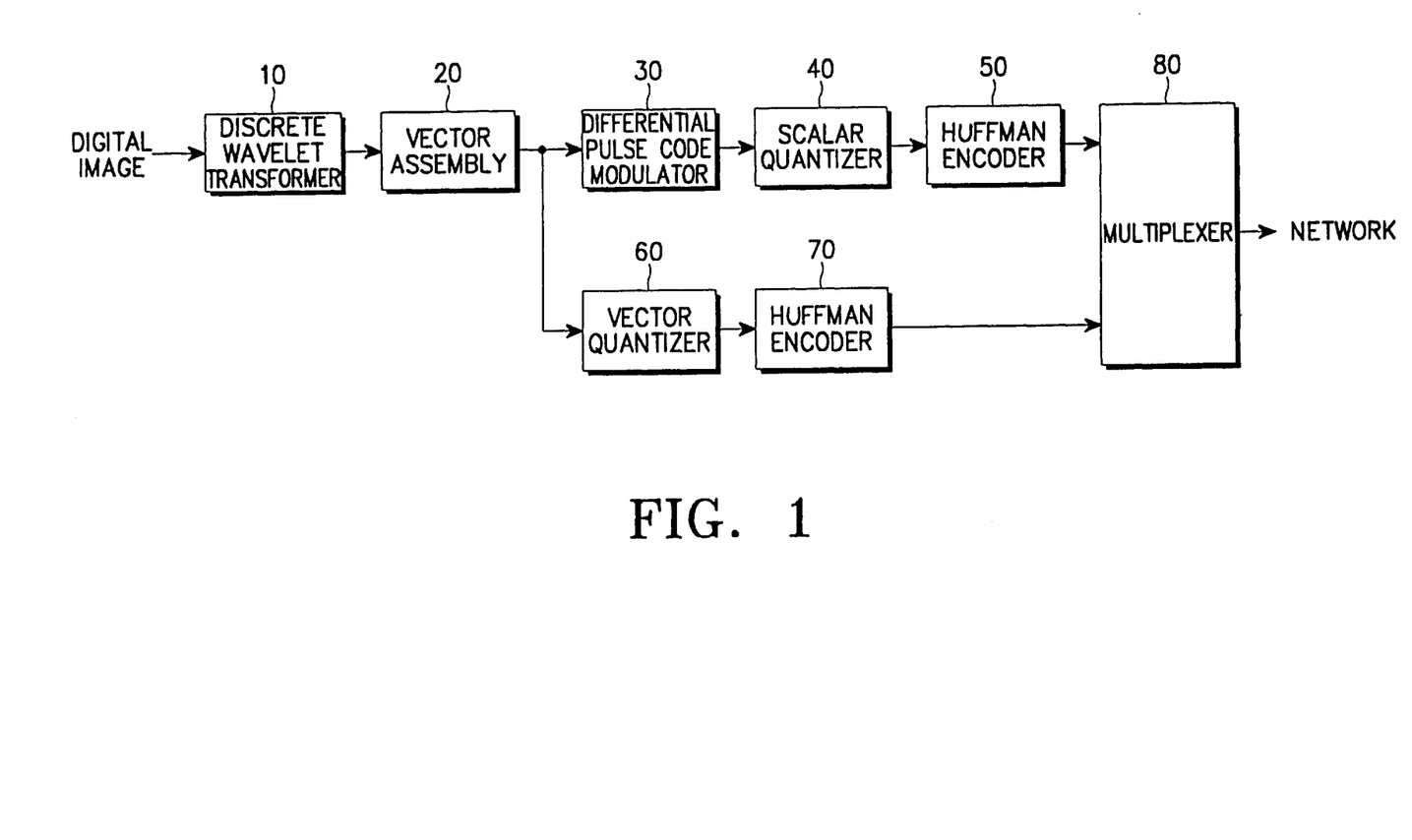
FIG. 1 is a block diagram of a conventional wavelet image compression system.
Figure 3:
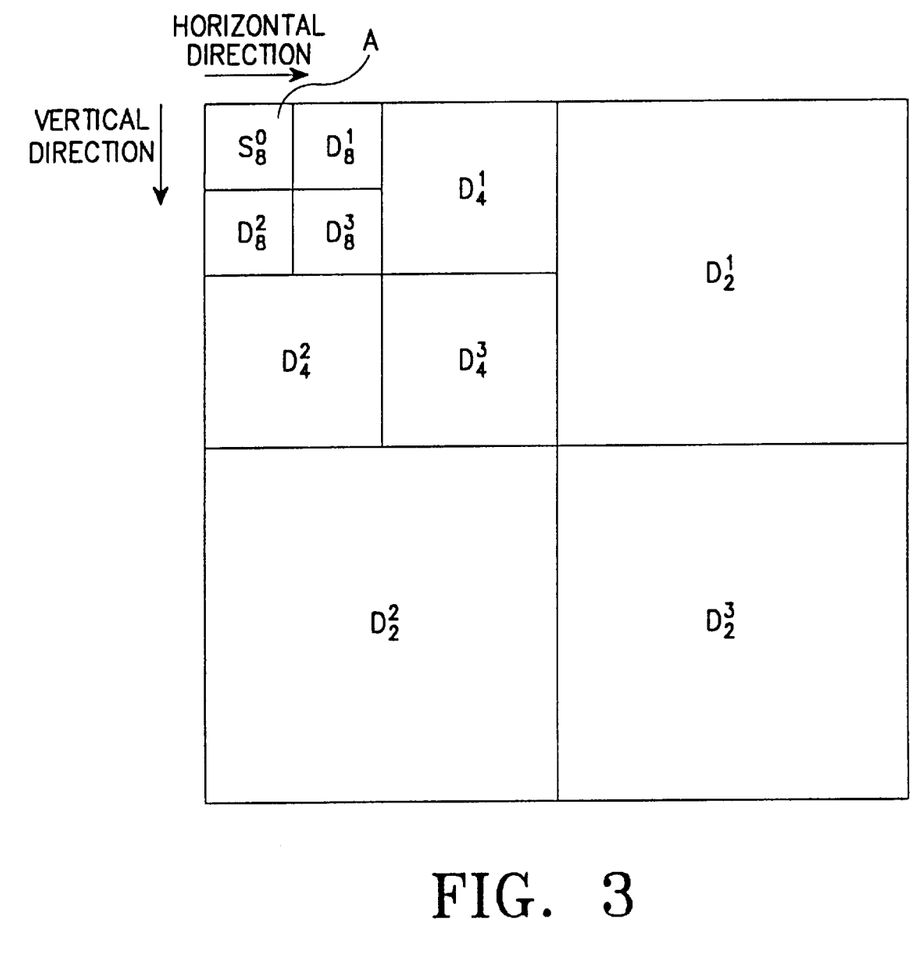
FIG. 3 shows the structure of a frame obtained by performing three stages of division for a digital image using discrete wavelet transformer 10 shown in FIGS. 1 and 2.

In general, image compression is performed for the purpose of reducing the bit rate of input image data for its transmission, or improving the efficiency of a storage for storing the image data. A conventional image compression system using a discrete wavelet transform is shown in FIG. 1. Referring to FIG. 1, a discrete wavelet transformer 10 wavelet-transforms an input digital image applied thereto, and outputs a wavelet signal having a configuration which is shown in FIG. 3. A vector assembly 20 receives the wavelet signal, and generates a wavelet signal having a DC coefficient and wavelet signal having an AC coefficient.

A differential pulse code modulator 30 differential-pulse-code-modulates the wavelet signal having a DC coefficient, to convert it into a differential wavelet signal, and supplies this differential wavelet signal to a scalar quantizer 40. Scalar quantizer 40 scalar-quantizes the differential wavelet signal, and supplies it to a Huffman encoder 50. Huffman encoder 50 encodes the scalar-quantized differential wavelet signal, converts it into a DC compression signal, and supplies the DC compression signal to one input terminal of a multiplexer 80.

A vector quantizer 60 receives the wavelet signal having an AC coefficient from vector assembly 20, vector-quantizes it, and supplies the vector-quantized wavelet signal to another Huffman encoder 70. Huffman encoder 70 encodes the vector-quantized wavelet signal having AC coefficient, converts it into an AC compression signal, and supplies this AC compression signal to the other input terminal of multiplexer 80. Multiplexer 80 transmits the AC compression signal and DC compression signal to a network through a channel, according to a selection signal supplied by a system controller (not shown).

When a 30 frames/sec color image in quadrature common intermediate format is compressed at 55:1 in the above-described image compression system using wavelet transform, the number of bit transmitted through the channel for one second equals $30\partial e\ 188\partial e\ 144\partial e 8\partial e 2\partial e 2\partial e\ (1/55) \approx 472{,}529.4$ bits/sec. When motion estimation is added to the compression system in the direction of reducing the temporal redundancy of a motion picture, using full search algorithm, to obtain five-fold compression effect, the number of bits transmitted per one second becomes 94,505.9 bits/sec. However, this value, 94,505.9 bits/sec, is relatively large when compared to the channel capacity of 28.8 kbits/sec currently available for transmitting data through the public switched telephone network (PSTN) by means of a modem. Accordingly, in order to transmit image data of this bit rate through a modem, it is required that either the number of transmission frames per second be reduced, or the source data of the digital image be compressed at higher compression factor which invariably results in a deterioration in the picture quality.

BRIEF SUMMARY OF THE INVENTION

An object of the present invention is to provide a circuit and method, which controls the amount of image compression data, which is processed in an image compression system using wavelet transform, accumulated in a channel buffer by removing data in a frequency band to which human eyes are less sensitive, from the wavelet-transformed image data, according to a reference value.

To achieve this object, a buffer data control circuit is provided in an image compression system using a wavelet transform. The buffer data control circuit includes a buffer for storing, for a predetermined time, compressed image data to be transmitted to a channel, as well as a buffer controller. The buffer controller has a data reference value, which is for integrating the input speed of the compressed image data input to the buffer over a predetermined period, and adding the integration value to the amount of data accumulated in the buffer at a specific time, to thereby estimate the amount of data to be accumulated for the next period. The buffer controller compares the amount of data to be accumulated for the next period with the data reference value, and generates a processing signal. The starting point of the predetermined period corresponds to the specific time. The buffer data control circuit also includes a vector assembly for removing data having high-frequency diagonal component from data forming the frame structure of a wavelet transformed image, according to the processing signal.

The present invention has broad applicability in image compression systems in general.

BRIEF DESCRIPTION OF THE DRAWINGS

The above-mentioned object and advantages, as well as other objects and advantages of the present invention will become clear upon review of the following description, considered in conjunction with the accompanying drawings in which.

DETAILED DESCRIPTION OF THE PREFERRED EMBODIMENT

The present invention is a buffer data control circuit (and the accompanying signal processing method) which controls the amount of image compression data, which is processed in an image compression system using wavelet transform, accumulated in a channel buffer. The amount of accumulated image compression data is controlled by removing, from the wavelet-transformed image data, data which lies in a frequency band to which human eyes are less sensitive, according to a reference value.

With reference to the attached drawings, a preferred embodiment of the present invention is described below in detail. Similar components are indicated by consistent reference numbers in FIGS. 1 and 2. While many particular details are set forth in the following description, such as components, these details are provided only for the purpose of aiding general understanding of the present invention and are not critical to the function or operation thereof. A person having general knowledge of this technology would appreciate that the present invention can be embodied without these particular details. In describing the present invention, a detailed description will be omitted if a detailed description of the prior function or construction makes the point of the present invention ambiguous.

Figure 2:
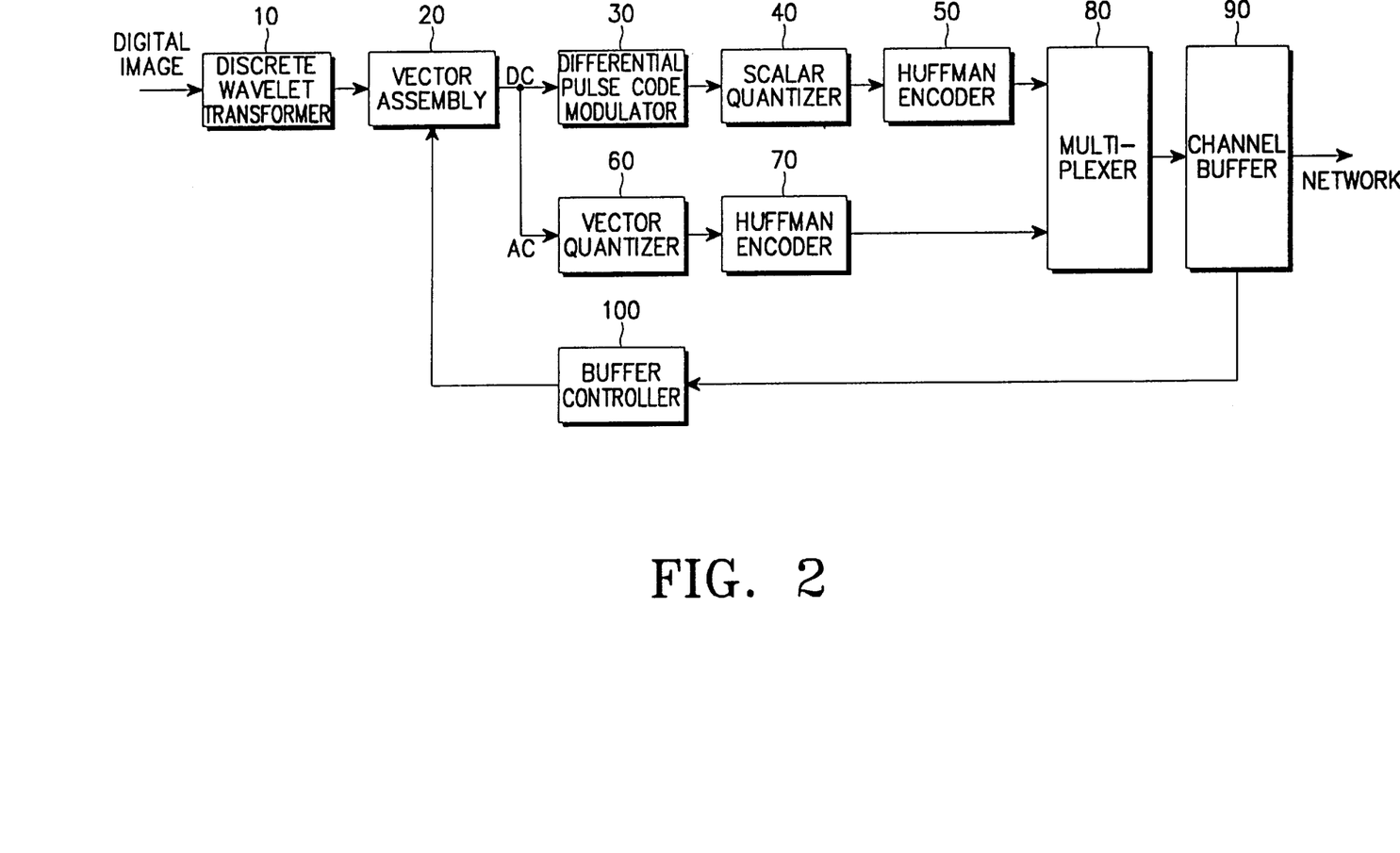
FIG. 2 is a block diagram of a wavelet image compression system according to the present invention.

FIG. 2 is a block diagram of an image compression system according to the present invention. Referring to FIG. 2, the discrete wavelet transformer 10 wavelet-transforms an input digital image, and outputs a wavelet signal which has a configuration as shown in FIG. 3, and which will be explained below. Vector assembly 20 receives the wavelet signal, and generates a wavelet signal having a DC coefficient and wavelet signal having an AC coefficient.

Differential pulse code modulator 30 modulates the wavelet signal having a DC coefficient, converts it into a differential wavelet signal, and supplies the differential wavelet signal to scalar quantizer 40. Scalar quantizer 40 quantizes the differential wavelet signal, and supplies the scalar-quantized differential wavelet signal to Huffman encoder 50. Huffman encoder 50 encodes the scalar-quantized differential wavelet signal, converts it into a DC compression signal, and supplies the DC compression signal to one input terminal of multiplexer 80.

Vector quantizer 60 receives the wavelet signal having an AC coefficient from vector assembly 20, vector-quantizes it, and supplies this vector-quantized wavelet signal to Huffman encoder 70. Huffman encoder 70 encodes the vector-quantized wavelet signal having an AC coefficient, converts it into an AC compression signal, and supplies the AC compression signal to the other input terminal of multiplexer 80. Multiplexer 80 supplies the AC compression signal and DC compression signal to a channel buffer 90 according to a selection signal of a system controller (not shown).

Channel buffer 90 receives the AC compression signal and DC compression signal, accumulates them, and transmits the accumulated signal to a network. A buffer controller 100 compares the amount of image compression signal accumulated in channel buffer 90 with first, second, and third reference values, and generates first, second, and third processing signals. Vector assembly 20 removes data in a frequency band to which human eyes are less sensitive, from the wavelet image data outputted from discrete wavelet transformer 10, according to the first, second, and third processing signals.

FIG. 3 shows the frame structure of a image which is wavelet-transformed by wavelet transformer 10 shown in FIG. 2. This frame structure is obtained through three stages of division. In this structure, $S_8^0$ represents a data cell which represents the DC signal. $D_M^i$ indicates a data cell in the direction i, where i represents a direction indication value. For example, when i=1, i=2 and i=3, they indicate the vertical direction, horizontal direction and diagonal direction, respectively. There is the relation of $M=2^m$, where M indicates index about resolution grades for m=1,2,3.

In the aforementioned frame structure, as the value M is smaller, the data cell has high-frequency component. The data cell of $S_8^0$ having largest M value (M=8) has low-frequency component. $D_M^1$ represents the vertical component of a data cell having $_2{}^m$ of resolution, $D_M^2$ represents the horizontal component of a data cell having $_2$m of resolution, and $D_M^3$ represents the diagonal component of a data cell having $2^m$ of resolution.

Commonly, human eyes are most sensitive to the spatial frequency of 4.7 to 8 cycle per degree (cpd) according to the characteristic of MTF function, and have sensitivity of 3% of the maximum value at a high frequency region. With regard to direction angle characteristic according to Campbell, an image of θ=45° component has sensitivity lower than images having the direction angles of 0° and 90° by 3 dB.

Figure 4:
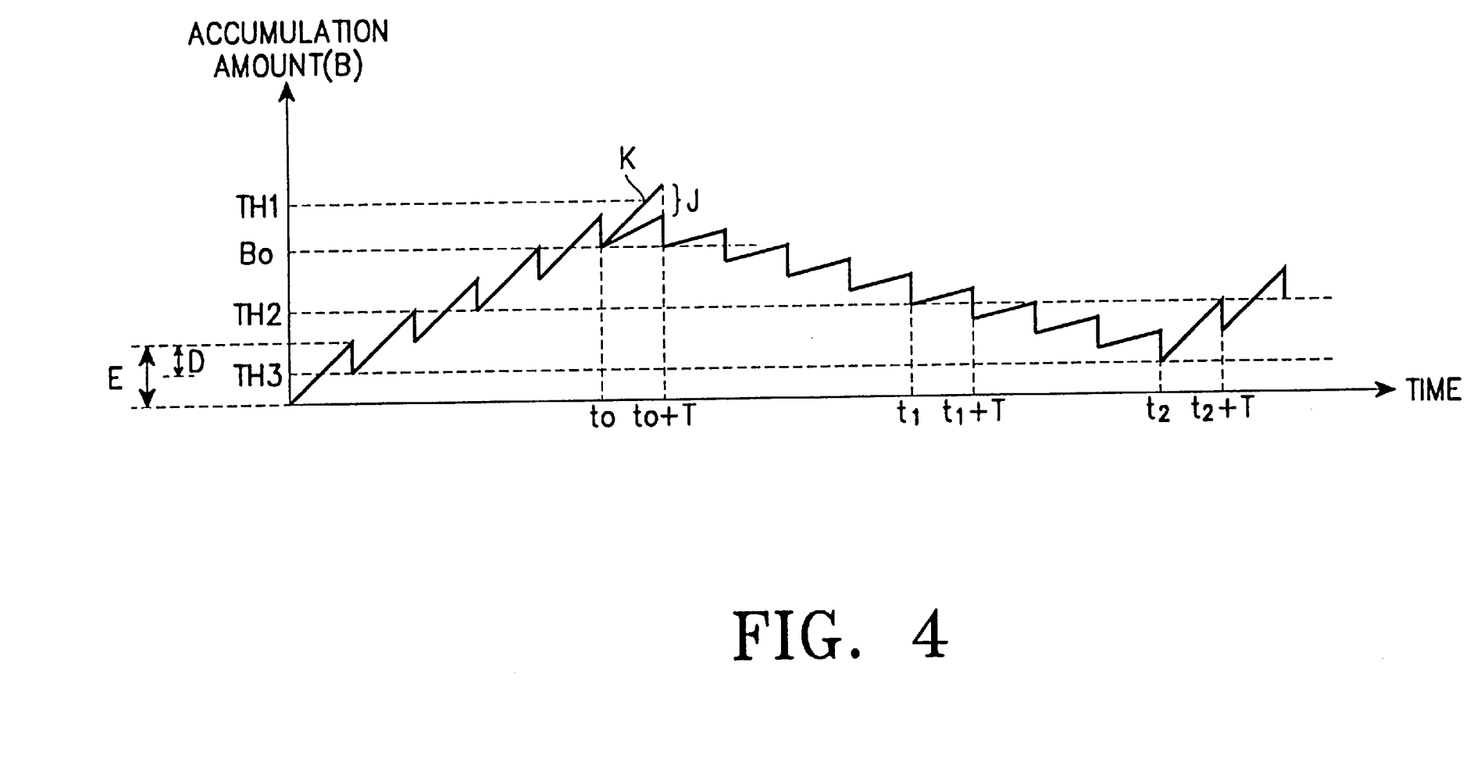
FIG. 4 shows the variation of amount B of image compression data accumulated in channel buffer 90 of FIG. 2, which is controlled by buffer controller 100.

Accordingly, buffer controller 100 shown in FIG. 2 gradually removes from the spatial region, by stages, the data cells of high-frequency/diagonal components which are vector-quantized in vector quantizer 60. According to the present invention, the order of removal of data cells for transmission is $D_2^3 > D_4^3 > D_8^3$. The buffer controller 100 according to the present invention compares the amount of data accumulated in channel buffer 90 with a corresponding reference value, and removes data cells $D_2^3 + D_4^3 + D_8^3$ or $D_2^3$ which correspond to high-frequency and diagonal components. FIG. 4 shows the variation of the amount of data accumulated in channel buffer 90.

Buffer controller 100 compares the amount of data currently accumulated in channel buffer 90, and the amount of data which will be accumulated after the next frame is processed, with the first, second and third reference values TH1, TH2 and TH3, generates the first, second, and third processing signals, and applies them to vector assembly 20.

When the bit rate of data applied to channel buffer 90 is $I_0(t)$(bit/sec), the transmission period for each frame is T, the amount of data accumulated in channel buffer 90 is B, and the amount of data outputted from channel buffer 90 every period T is D, the amount of data accumulated in channel buffer 90 after lapse of period T can be estimated as the following formula (1), in case that the amount of data accumulated in channel buffer 90 is $B_0$ at time $t_0$.

$$B = B_0 + \int_{t_0}^{t_0+T} I_0(t)dt \qquad (1)$$

In this formula, when the amount B of data accumulated in channel buffer 90 is larger than first reference value TH1, serious overflow occurs. Accordingly, coding data should be reduced in the source coding of digital image data. In this case, the vector assembly 20 receives the second process signal and removes $D_2^3$, $D_4^3$ and $D_8^3$ from the frame structure of the wavelet transformed image, and then vector quantizer 60 and Huffman encoder 70 code the source data. By doing so, the amount of coded source data of the digital image data is reduced to 43/64. Accordingly, the transmission speed of data from the channel buffer to channel is higher than data input speed to the channel buffer, decreasing the amount of data accumulated in channel buffer 90 at time $t_0+T$ by J.

With the lapse of $t_1$ sec, buffer controller 100 changes the data input speed to channel buffer 90 from $I_0(t)$ to $I_1(t)$, and estimates the amount of data accumulated for the next period as the following formula (2).

$$B = B_1 + \int_{t_1}^{t_1+T} I_1(t)dt \qquad (2)$$

To minimize the deterioration of picture quality due to the abrupt removal of the amount of source data of digital image data, buffer controller 100 generates the third processing signal when data amount B obtained from formula (2) is identical to or smaller than second reference value TH2. Then, vector assembly 20 receives the third processing signal, removes only $D_2^3$ from the frame structure of the wavelet transformed image, and supplies the frame structure from which $D_2^3$ is removed to vector quantizer 60. Vector quantizer 60 vector-quantizes the frame structure from which $D_2^3$ is removed, and applies it to Huffman encoder 70. Huffman encoder 70 codes the vector-quantized data, and transmits it to the channel through channel buffer 90. By doing so, the data amount is controlled to input $I_2(t)$ larger than $1_1(t)$ to channel buffer 90. After the lapse of $t_1$ sec, with data input speed $I_2(t)$ to channel buffer 90, buffer controller 100 estimates the amount of data accumulated for the next period as the following formula (3).

$$B = B_2 + \int_{t_2}^{t_2+T} I_2(t)dt \qquad (3)$$

The amount of data accumulated in channel buffer 90 through formula (3) may be underflow. To prevent this, the data input speed to channel buffer 90 is changed from $I_2(t)$ to $I_0(t)$ when the amount of accumulated data is identical to or smaller than third reference value TH3. This means that the source data of digital image is not removed any more, and the entire frame is transmitted to the channel.

Figure 5:
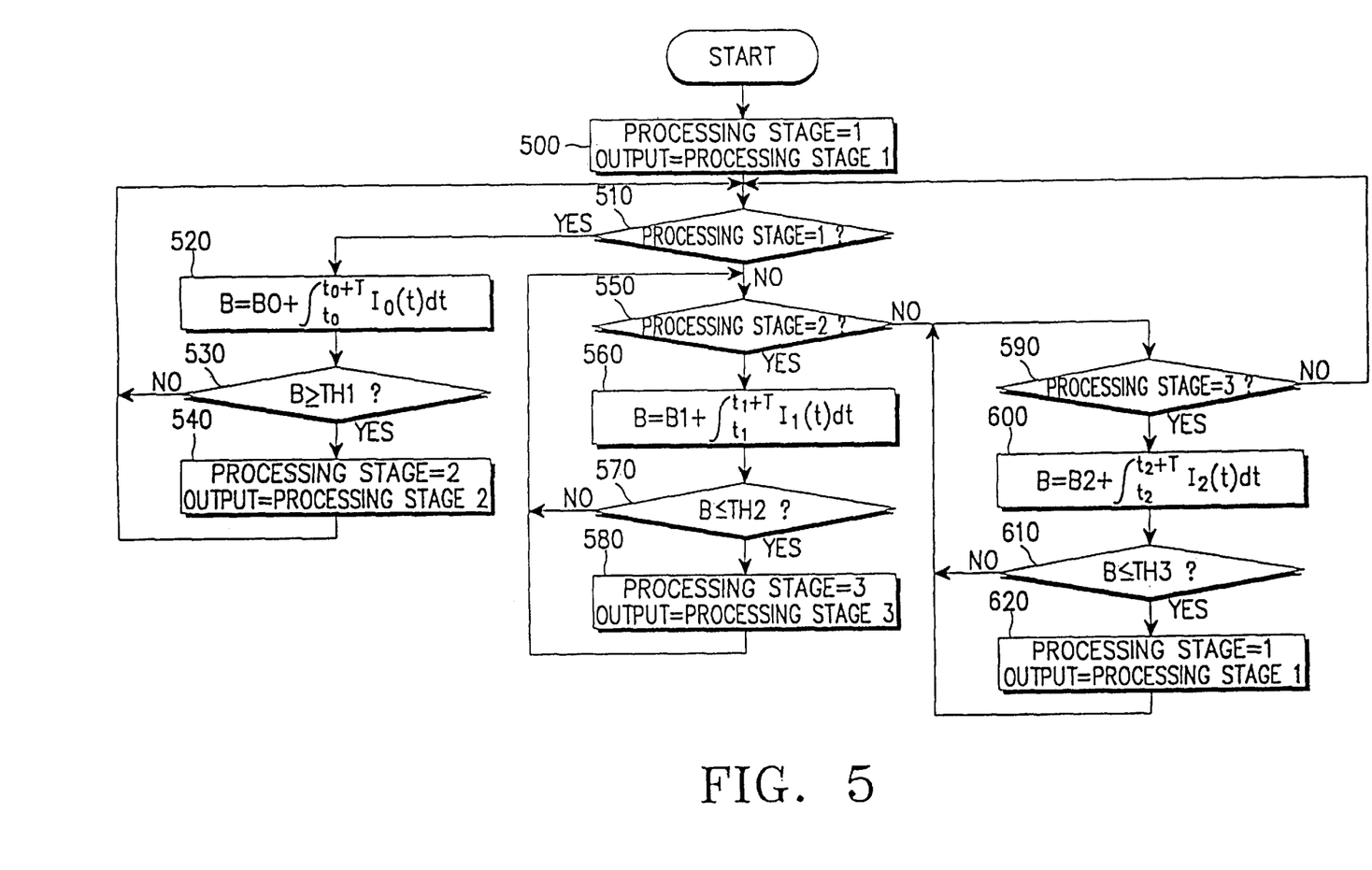
FIG. 5 is a flow chart showing a method for controlling the amount of video compression data accumulated in channel buffer 90 by the use of buffer controller 100 shown in FIG. 2.

FIG. 5 is a flow chart showing a method of estimating the amount of data accumulated for the next period on the basis of the data input speed to channel buffer 90 at a specific time, and the amount of data currently accumulated. At step 500, buffer controller 90 sets the processing stage to 1, and sets the output to processing stage 1. Then, buffer controller checks if the processing stage is set to 1, at step 510. Here, when the processing stage is 1, buffer controller 100 estimates the amount B of data to be accumulated in channel buffer 90 at $t_0+T$ by integrating data input speed $I_0(t)$ for the time from to to $t_0+T$, and adding it to amount $B_0$ of data accumulated in channel buffer 90 at $t_0$.

Proceeding to step 530, buffer controller 100 checks if amount B of data to be accumulated in channel buffer 90 at time $t_0+T$ is identical to or larger than first reference value TH1. When data amount B is identical to or larger than first reference value TH1, buffer controller 100 sets the processing stage to 2, sets the output to processing stage 2 at step 540, and then returns to step 510. When amount B of data to be accumulated in channel buffer 90 at time $t_0+T$ is not identical to or larger than first reference value TH1, buffer controller 100 goes directly back to step 510.

When the processing stage is not 1 at step 510, buffer controller 100 proceeds to step 550 and checks if the processing stage is 2. Here, when the processing stage is 2, buffer controller 100 estimates the amount B of data to be accumulated in channel buffer 90 at $t_1+T$ by integrating data input speed $I_1(t)$ for the time from $t_1$ to $t_1+T$, and adding it to amount $B_1$ of data accumulated in channel buffer 90 at $t_1$, at step 560. Proceeding to step 570, the buffer controller checks if the data amount B is identical to or smaller than second reference value TH2. When the data amount B is identical to or smaller than second reference value TH2, buffer controller 100 sets the processing stage to 3, sets the output to processing stage 3, and returns to step 550. When the data amount B is larger than second reference value TH2 at step 570, buffer controller 100 proceeds directly to step 550.

When the processing stage is not 2 at step 550, buffer controller 100 goes to step 590, and checks if the processing stage is 3. When the processing stage is 3, buffer controller 100 estimates the amount B of data to be accumulated in channel buffer 90 at $t_2+T$ by integrating data input speed $I_2(t)$ for the time from $t_2$ to $t_2+T$, and adding it to amount $B_2$ of data accumulated in channel buffer 90 at $t_2$, at step 600. Then, buffer controller 100 checks if amount B of data to be accumulated in channel buffer 90 at time $t_2+T$ is identical to or smaller than third reference value TH3 at step 610. When amount B of data to be accumulated in channel buffer 90 at time $t_2+T$ is identical to or smaller than third reference value TH3, buffer controller 100 sets the processing stage to 1, sets the output to processing stage 1, returns to step 590, and repeats the following steps.

The first, second, and third processing signals generated from processing stages 1, 2, and 3 are applied to vector assembly 20. The operation of vector assembly 20 performed for these signals is explained below with reference to the flow chart of FIG. 6. Vector assembly 20 receives the output of buffer controller 100 at step 650, and checks if the output is the first processing signal at step 660. When the output is the first processing signal, vector assembly 20 removes $D_2^3$, $D_4^3$ and $D_8^3$ from the frame structure of image outputted from discrete wavelet transformer 10, and completes the process.

Figure 6:
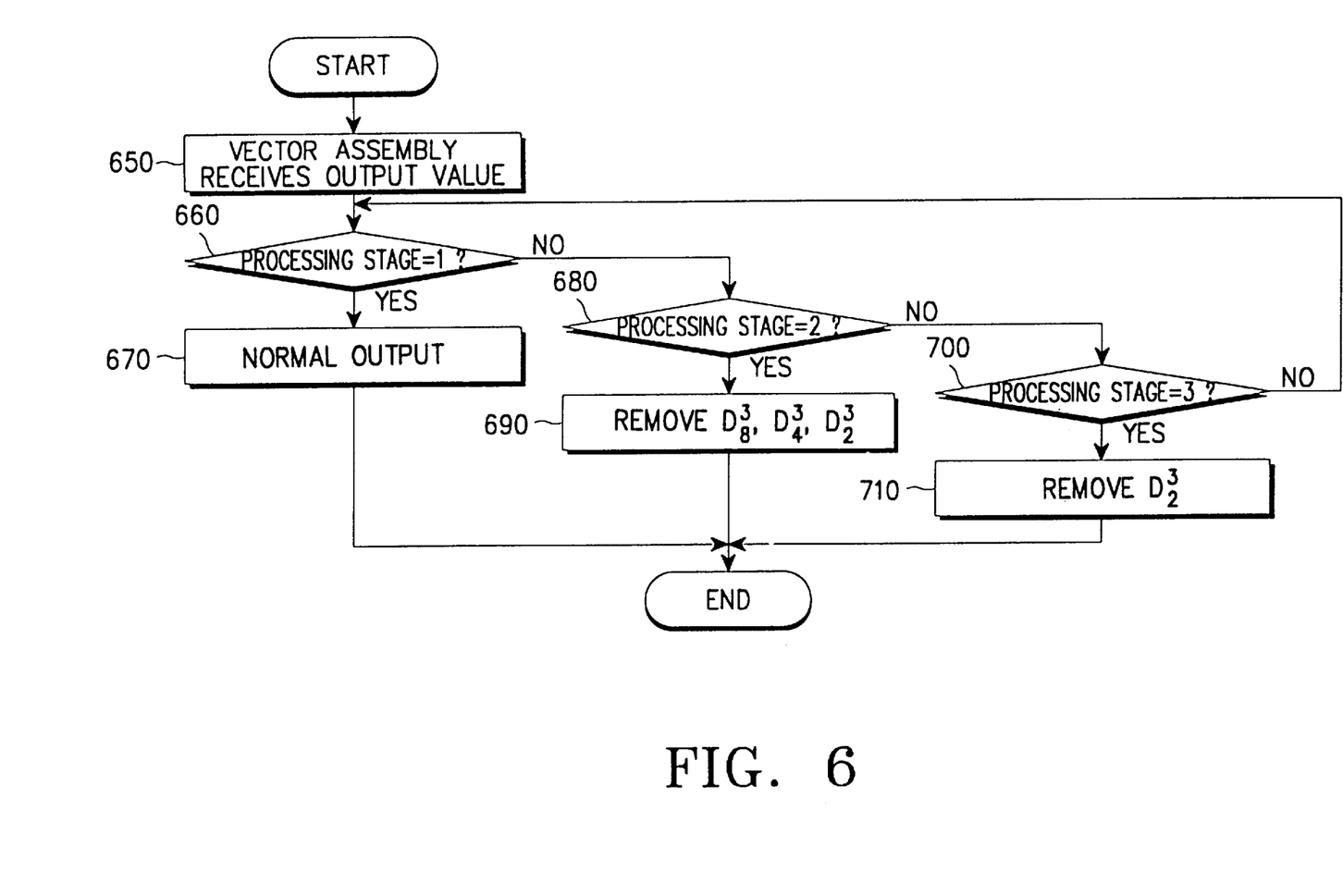
FIG. 6 is a flow chart showing a method for removing a data cell in the diagonal direction from image data processed in discrete wavelet transformer 10 according to the output of buffer controller 100, by the use of vector assembly 20 shown in FIG. 2.

When the output is not the first processing signal at step 660, vector assembly 20 checks if the output is the second processing signal at step 680. When the output is the second processing signal, vector assembly 20 removes $D_2^3$ from the frame structure of image outputted from discrete wavelet transformer 10, and completes the process. When the output is not the second processing signal at step 680, vector assembly 20 checks if the output is the third processing signal at step 700. When the output is the third processing signal, vector assembly 20 outputs the frame structure of image outputted from discrete wavelet transformer 10 without any change, and completes the process, at step 710. When the output is not the third processing signal at step 700, vector assembly goes back to step 660, and repeats the subsequent steps.

As described above, the present invention controls the amount of wavelet-transformed image data accumulated in a channel buffer by removing the data of high-frequency/diagonal component, from the image data, to thereby prevent overflow in the channel. This improves the data transmission rate. Furthermore, when the image transmitted through the channel is reproduced, good picture quality is obtained.

Therefore, it should be understood that the present invention is not limited to the particular embodiment disclosed herein as the best mode contemplated for carrying out the present invention, but rather that the present invention is not limited to the specific embodiments described in this specification except as defined in the appended claims. It will also be understood that various modifications and changes may be made to the described embodiment without departing from the spirit and scope of the present invention.

What is claimed is:

1. A buffer data control circuit in a wavelet transform image compression system, the buffer data control circuit comprising:
   a buffer storing compressed image data for a predetermined time period, prior to being transmitted to a channel;
   a buffer controller, having one or more data reference values, operating according to an algorithm such that it:
   integrates the input speed of compressed image data input to said buffer during a current time slot to produce an integrated value,
   adds said integration value to an amount of data accumulated in the buffer at a specific time to produce an estimate of the amount of data to be accumulated for a first future time period,
   compares said estimate of the amount of data to be accumulated in the buffer for the first future period to a first reference value corresponding to an overflow state of the amount of data accumulated in said buffer to produce a comparison result, and
   generates a first processing signal based on said comparison result; and
   a vector assembly for removing all data cells having high-frequency diagonal components, according to the first processing signal, from data forming a frame structure of a wavelet transformed image.

2. The buffer data control circuit as claimed in claim 1, wherein said buffer controller compares an estimate of the amount of data to be accumulated for a second future period to a second reference value corresponding to a level of the picture quality deterioration, after the removal of all data cells having high-frequency diagonal component by said vector assembly according to the first processing signal, to generate a second processing signal based on the comparison result; and
   wherein said vector assembly removes only one of the data cells having high-frequency diagonal components, according to the second processing signal from data forming a frame structure of a wavelet transformed image to minimize the picture quality deterioration due to the removal of all data cell having high-frequency diagonal components.

3. The buffer data control circuit as claimed in claim 2, wherein buffer controller compares an estimate of the amount of data to be accumulated for a third future period to a third reference value corresponding to an underflow state of the amount of data accumulated in said buffer, after the removal of only one of the data cells having high-frequency diagonal component by said vector assembly according to the second processing, to generate a third processing signal based on the comparison result, and
   wherein said vector assembly does not remove any of the data cells having high-frequency diagonal components, according to the third processing signal, from data forming a frame structure of a wavelet transformed image.

4. The buffer data control circuit as claimed in claim 1, wherein said specific time is at commencement of said current time slot and said current time slot has a duration equal to said predetermined time period.

5. A buffer data control method for use in controlling a wavelet transform image compression system, the method comprising the steps of:
   (a) storing, in a buffer, for a predetermined time period, compressed image data to be transmitted to a channel;
   (b) integrating, over said predetermined time period, the speed at which said compressed image data is input to said buffer to produce an integration value;
   (c) adding said integration value to an amount of data accumulated in said buffer at a specific time to produce an estimate of the amount of data to be accumulated for a first future time period;
   (d) comparing said estimate of the amount of data to be accumulated in said buffer for the first future time period with a first data reference value corresponding to an overflow state of the amount of data accumulated in said buffer to produce a first comparison result;
   (e) generating a first processing signal based on said first comparison result; and
   (f) removing all data cells, based on said first processing signal, having a high-frequency diagonal component from data forming a frame structure of a wavelet transformed image.

6. The buffer data control method as claimed in claim 5, wherein said specific time is the starting point of said predetermined time period.

7. The buffer data control method as claimed in claim 5, further comprising the steps of:
   (g) comparing an estimate of the amount of data to be accumulated in said buffer for a second future time period with a second reference value corresponding to a level of the picture quality deterioration, after the removal of all data cells having a high-frequency diagonal component according to the first processing signal, to generate a second comparison result;
   (h) generating a second processing signal based on said second comparison result; and
   (i) removing only one of the data cells based on said second processing signal, having a high-frequency diagonal component from data forming a frame structure of a wavelet transformed image to minimize the picture quality deterioration due to the removal of all data cells having high-frequency diagonal components.

8. The buffer data control method as claimed in claim 7, further comprising the steps of:
   (j) comparing an estimate of the amount of data to be accumulated for a third future time period with a third reference value corresponding to an underflow state of the amount of data accumulated in said buffer, after the removal of only one of the data cells having a high-frequency diagonal component according to the second processing signal to generate a third comparison result;
   (k) generating a third processing signal based on said third comparison result; and
   (l) removing none of the data cells, based on said third processing signal, having a high-frequency diagonal component from data forming a frame structure of a wavelet transformed image.

9. The buffer data control method as claimed in claim 8, wherein in said step (e), when said estimate of the amount of data to be accumulated for the first future time period exceeds said first reference value, said processing signal is generated.

10. The buffer data control method as claimed in claim 9, wherein in said step (h), when said estimate of the amount of data to be accumulated for the second future time period drops below said second reference value, said second processing signal is generated.

11. The buffer data control method as claimed in claim 10, wherein in said step (k), when said estimate of the amount of data to be accumulated for the third future time period drops below said third reference value, said third processing signal is generated.

12. The buffer data control method as claimed in claim 5, wherein in said step (f), data cells $D_2^3$, $D_4^3$, and $D_8^3$ are removed from said data forming a frame structure of a wavelet transformed image in accordance with said first processing signal.

13. The buffer data control method as claimed in claim 7, wherein in said step (i), only data cell $D_2^3$ is removed from said data forming a frame structure of a wavelet transformed image in accordance with said second processing signal.

* * * * *